Feb. 5, 1952
G. W. DAHL
2,584,847
AUTOMATICALLY OPERATED VALVE WITH
CONTINUOUSLY CONNECTED HAND WHEEL
Filed April 17, 1948
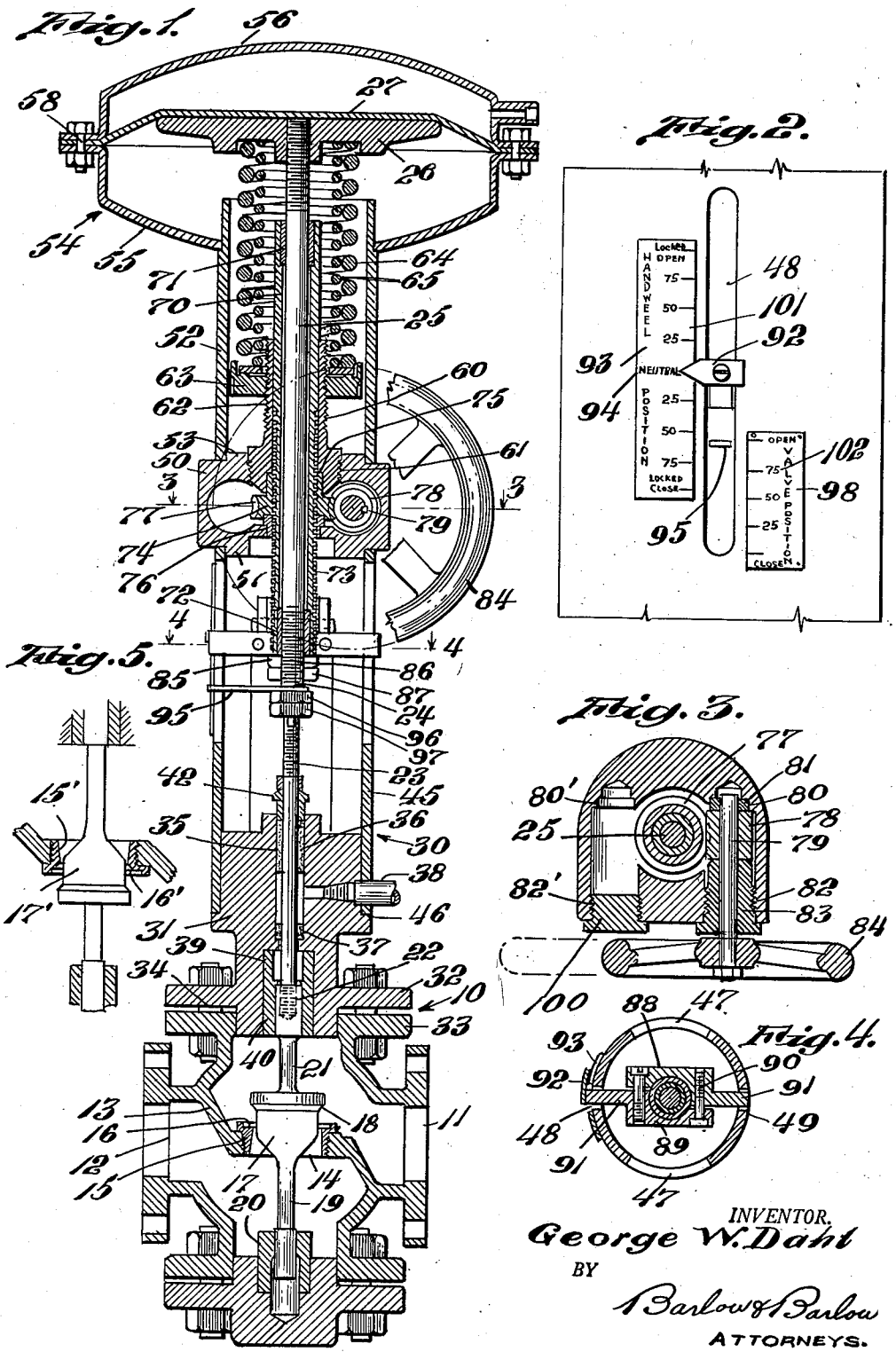
INVENTOR.
George W. Dahl
BY
Barlow & Barlow
ATTORNEYS.

Patented Feb. 5, 1952

2,584,847

UNITED STATES PATENT OFFICE 2,584,847

AUTOMATICALLY OPERATED VALVE WITH CONTINUOUSLY CONNECTED HANDWHEEL

George W. Dahl, Barrington, R. I., assignor, by mesne assignments, to Reconstruction Finance Corporation, Boston, Mass., a corporation of the United States Application April 17, 1948, Serial No. 21,614

6 Claims. (Cl. 137—139)

1

This invention relates to a fluid-operated valve, more particularly one having a chamber and diaphragm for closing the plug.

Heretofore, in the operation of this type of valve, a hand wheel for operating the valve was an accessory or attachment which could be mounted for use when some fault occurred in the fluid pressure operation of the valve. Also, in the operation of valves where a hand wheel was utilized, movement occurred through a lever which supplied but a limited amount of movement and at some positions a disadvantageous leverage to the valve. Frequently it was desired that a valve be held partly open or partly closed, and the provisions for limiting the movement have been complicated.

One of the objects of this invention is to provide a hand wheel which will be continuously mechanically connected for operation of the valve at any time regardless of the position which it may assume by reason of the automatic actuation.

Another object of this invention is to provide a hand wheel which may be used for manipulation of the valve plug at any time, even though there is an opposing fluid pressure loading.

Another object of this invention is to provide an arrangement so that the mechanism which is operated by the hand wheel may also be used as a valve limiting means.

Another object of this invention is to provide a construction so that regardless of the direction of movement of the plug to seat the same, the rotation of the hand wheel may always be in the same direction for closing movement and in the same direction for opening movement of the valve.

Another object of this invention is to provide an arrangement so that the movement imparted by the hand wheel may be unlimited in its length.

Another object of this invention is to provide an arrangement so that there will be uniform thrust by reason of the hand wheel at all times.

Another object of this invention is to provide an arrangement so that the position of the valve may be known at all times and also the position of the hand wheel actuating mechanism may also be known at all times.

With these and other objects in view, the invention consists of certain novel features of construction as will be more fully described and particularly pointed out in the appended claims.

In the accompanying drawings:

Figure 1 is a sectional view through the body of the valve and its automatic and manual actuating mechanism for the stem of the valve;

2

Figure 2 is a view on a larger scale of the indicating mechanism for showing the position of the hand wheel actuating mechanism and also the plug;

Figure 3 is a sectional view on line 3—3 of Figure 1;

Figure 4 is a sectional view on line 4—4 of Figure 1; and

Figure 5 is a fragmental sectional view illustrating the detail of the valve seat and valve positioned on the stem to close by movement in the opposite direction from that shown in Figure 1.

In proceeding with this invention, in a diaphragm-operated valve I provide a sleeve which embraces the valve stem, this sleeve being of a substantial length and capable of engaging a button attached to the diaphragm so as to limit the downward movement of the stem by such engagement. Also, there is provided an adjustable stop on the valve stem to engage the other end of the sleeve which will provide a certain relative movement between the stem and the sleeve and yet limit the movement of the stem in opposite directions. The sleeve may be adjusted in position by a hand wheel so that its limiting action may be varied, and also this wheel may serve as a means for moving the valve stem in one direction or the other, regardless of the loading of the diaphragm with fluid pressure. In order that the movement of the sleeve for opening or closing the valve may be uniform with reference to the rotation necessary to be given to the hand wheel, I have provided bearings on either side of a nut which operates the sleeve for mounting a shaft through which the nut may be operated, so that whether it is necessary to move the valve upwardly to closed position or downwardly to closed position, there may still be the same rotation given the hand wheel by selecting the proper bearing for the position of the shaft.

With reference to the drawings, 10 designates generally the valve body which is provided with inlet and outlet openings 11 and 12 which are separated by a web 13 having an aperture 14 through it in which there is removably positioned a bushing 15 providing a valve seat 16 to be closed by a valve plug 17 having a seating surface 18 thereon to engage this seat 16 and prevent passage of fluid from the opening 11 to the opening 12. This plug 17 is provided with a stem 19 extending downwardly into the guiding opening in sleeve 20 and a stem 21 extending upwardly into the guiding opening in the sleeve 40. By means of a joint 22 the stem continues by a section 23 of smaller diameter which is shouldered as at 24 and of a larger diameter as at 25 as it extends further upwardly to the button 26 which is secured to the diaphragm 27.

Upon the valve body 10 there is mounted certain super-structure which is designated generally 30 and comprises a base portion 31 having a flange 32 to join the flange 33 of the body by means of bolts 34. In this base there is provided a bore 35 which receives the sealing bushings 36 and 37 which are provided in spaced relation and between which there is the vent 38. The lower portion of the bore 39 is of a larger diameter and receives the guiding bushing 40 for the section 21 of the stem. A packing gland 42 serves to seal the upper bore 35.

Upon this base 31 there is mounted a cylindrical super-structure 45 by reason of its telescoping with the upper portion of the base and lodging against shoulders 46 of the base. This super-structure is provided with opposite openings as at 47—47 for access to the stem and also slotted as at 48 and 49 through which slots members which indicate the positions of parts of the working mechanism are positioned. This cylindrical structure 45 receives at its upper end a block 50 by reason of the reduced portion 51 thereof telescoping into the cylinder 45, and upon this block there is mounted another cylindrical member 52 which telescopes onto the reduced portion 53 of the block and supports at its upper end a diaphragm chamber 54 having a casing formed of parts 55 and 56 which are secured together by bolts 58 with the diaphragm 27 between.

A tubular member 60 is threaded into the block 50 as at 61 and has an outer threaded surface 62 which adjustably supports an abutment 63 between which, and the button 26, two springs 64 and 65 are supported for urging the diaphragm 27 upwardly. The tension of these springs may be varied by adjusting the position of the abutment 63 on the threaded tubular member 60.

A sleeve 70 embraces the stem portion 25 and is bushed as at 71 at its upper end for sliding engagement with the stem portion 25, while it is bushed as at 72 at its lower end for a similar sliding engagement with the stem 25. This sleeve is threaded on its outer surface as at 73 which threads are engaged by a nut 74 which is rotatably mounted in the block 50 between an abutment 75 in the tubular member 60 and a collar 76 located in an opening in the block 50. This nut 74 is provided with a worm gear 77 on its outer surface and is engaged by a worm 78 (see Figures 1 and 3) so that as a shaft 79 upon which the worm is mounted is rotated, the nut will be revolved to jack the sleeve upwardly or downwardly depending upon the direction of rotation of the shaft 79. The shaft 79 is provided with a bearing 80 which may be bushed as at 81 for the rotation of the shaft therein, and also provided with a bearing 82 which may be bushed as at 83 for rotatably supporting the other end of the shaft 79. A hand wheel 84 is provided on the end of the shaft 79 for turning the same.

Bearings are not only positioned in the block on one side of the nut, but there are also duplicate bearings as at 80' and 82' on the other side of the nut, so that the bushings 81 and 83, together with the worm and shaft, may be positioned in the bearings 80' and 82', should it be desired to turn the nut 74 in the opposite direction with the same rotation of the hand wheel 84. This opposite movement with the same direction of rotation would be desirable where it is desirable to have the valve plug 17', as shown in Figure 5, seat upon the seat 16' in bushing 15' by movement of the plug upwardly to its seat, rather than downwardly as in Figure 1.

An abutment 85 consisting of a nut threaded onto the portion 86 of the stem is provided to be engaged by the lower end of the sleeve, and this abutment is held in position by a check nut 87 which binds the abutment 85 in position.

In order that the position of the sleeve may be known, an indicator is clamped upon the lower end of the sleeve by means of jaws 88 and 89 (see Figure 4) held in engagement by screws 90. The jaws each are provided with a fin 91, and on one of these fins there is provided a pointer 92 (see Figure 2) which will extend laterally over a scale 93 having marked thereon a neutral position 94 which will indicate a position of the sleeve which will in no way interfere with the movement of the stem; whereas, at either side of this neutral, there are located numbers indicating the percentage open or closed positions to which the valve may be moved if the sleeve is positioned at these locations so as to limit the movement of the valve in the amounts indicated by the position of the pointer.

A second pointer 95 engages an abutment or shoulder 24 between the stem portions 23 and 25 and is held in this position by a nut 96 and check nut 97. This indicates the actual position of the stem by reason of the pointer 95 extending out through the opening 48, as shown in Figure 2, and moving along the markings 98 to show that the plug is either open or closed or in some intermediate position, such as 25%, 50%, or 75% between open and closed position. In operation if it is desired that a right-hand rotation of the hand wheel will move the plug to its seat, then shaft 79 and its bushings will be positioned in the selected bearings either 80 and 82 or 80' and 82' and a closure cap 100 will close the unused bearings. If it is desired that the automatic operation of the valve shall be unrestricted, the hand wheel will set the pointer 92 to neutral, as shown in Figure 2. If it is desired that the valve be operated pneumatically between 35% open and 75% open, this may be accomplished by rotating the hand wheel 84 so that the pointer 92 is at 35% locked open designated as 101 on the indicator plate 93. The valve will then be moved by the hand wheel until pointer 95 is at 75% on scale 98 as at 102 and then abutment 85 will be adjusted to the clamp 89 so that the stem will stop in its opening movement at this location and then the valve will travel between these two limits as desired. Should there be any reason for closing the valve or opening the valve manually because of some failure of the automatic actuation, the hand wheel may be rotated in the desired direction to accomplish this result, regardless of the prior setting by merely rotation thereof to move the sleeve to the desired point. It will be realized that when the sleeve is moved up to a certain position, so that the button 26 engages it, an effective stop is provided to limit the movement of the diaphragm toward moving the valve stem downwardly, that likewise, the opposite end of the sleeve will limit the movement of the valve stem upwardly.

I claim:
1. In combination a body having a flat face, an externally threaded element extending through said body and axially movable therein, a threaded member threadingly engaging said element for driving the same upon rotation of said member, worm gear teeth on said member, said body having parallel bores extending inwardly from the same flat face thereof providing bearings on the opposite sides of the member, a shaft having a worm engaging the teeth of said member and located in the selected bearing, depending on the direction of rotation desired for the shaft and member, and a hand wheel for rotating said shaft.

2. In combination a body, a stem movable through said body, spaced abutments secured to said stem, a sleeve embracing said stem between the abutments and of a length less than the distance between said abutments and movable along said stem between said abutments to engage one of said abutments and in turn move said stem, threads on said sleeve, a member rotatably held against axial movement in said body and engaging said threads to move said sleeve upon being rotated, and gear means for rotating said member.

3. In a flow control valve having a valve body with inlet and outlet openings and a port affording communication between said openings, the combination with a valve plug movable relatively to said port for governing flow through said valve, a motor for moving said valve plug over a predetermined range, a casing structure fixedly connecting said valve body and motor, a stem movable through said casing structure and connecting said motor and plug, spaced abutments secured to said stem, a sleeve embracing said stem and located between said abutments and manual means for moving said sleeve along said stem relative to said casing structure and port for engagement by said abutments, said manual means comprising a threaded member for driving said sleeve, a block having a flat face fixed to the casing and having parallel bores extending inwardly from said flat face providing bearings on opposite sides of the member, a shaft with a hand wheel thereon located from the said face in the selected bearing depending on the rotation desired for the sleeve, and a worm gear on the member and a cooperating worm on the shaft for rotating the member.

4. In a valve as in claim 3 wherein indicating means are provided on said stem to indicate exteriorly of the body the position of said plug.

5. In a valve as in claim 3 wherein indicating means are provided on said sleeve to indicate exteriorly the position of said sleeve.

6. In a valve as in claim 3 wherein indicating means are provided on said stem to indicate exteriorly of the body the position of said plug, and indicating means are provided on said sleeve to indicate exteriorly the position of said sleeve.

GEORGE W. DAHL.

REFERENCES CITED

The following references are of record in the file of this patent:

UNITED STATES PATENTS

| Number | Name | Date |
| --- | --- | --- |
| 1,599,729 | Taylor | Sept. 14, 1926 |
| 2,277,075 | Dahl | Mar. 24, 1942 |
| 2,319,336 | McCullough | May 18, 1943 |
| 2,335,143 | Dahl | Nov. 23, 1943 |
| 2,414,032 | Fawkes | Jan. 7, 1947 |